United States Patent
Korus et al.

(10) Patent No.: US 7,804,807 B2
(45) Date of Patent: Sep. 28, 2010

(54) MANAGING ESTABLISHMENT AND REMOVAL OF SECURITY ASSOCIATIONS IN A WIRELESS MESH NETWORK

(75) Inventors: Michael F. Korus, Eden Prairie, MN (US); Ohad Shatil, Kenosha, WI (US); Surong Zeng, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 675 days.

(21) Appl. No.: 11/531,498

(22) Filed: Sep. 13, 2006

(65) Prior Publication Data
US 2008/0031155 A1    Feb. 7, 2008

Related U.S. Application Data

(60) Provisional application No. 60/835,206, filed on Aug. 2, 2006.

(51) Int. Cl.
H04W 4/00 (2009.01)
(52) U.S. Cl. .................. 370/338; 370/315; 455/11.1
(58) Field of Classification Search .......... None
See application file for complete search history.

(56) References Cited

U.S. PATENT DOCUMENTS

| | | | |
|---|---|---|---|
| 7,031,266 B1 * | 4/2006 | Patel et al. ............. | 370/254 |
| 7,436,789 B2 * | 10/2008 | Caliskan et al. ......... | 370/310.1 |
| 7,634,230 B2 * | 12/2009 | Ji et al. .................. | 455/41.2 |
| 7,653,011 B2 * | 1/2010 | Rahman et al. .......... | 370/256 |
| 2003/0091001 A1 * | 5/2003 | Watanabe ................. | 370/236 |
| 2004/0259529 A1 * | 12/2004 | Suzuki ...................... | 455/411 |
| 2005/0152305 A1 * | 7/2005 | Ji et al. ...................... | 370/328 |
| 2005/0152333 A1 * | 7/2005 | Smith ........................ | 370/351 |
| 2006/0039329 A1 * | 2/2006 | Samuel et al. ............. | 370/335 |
| 2006/0126845 A1 | 6/2006 | Zheng | |
| 2006/0146846 A1 | 7/2006 | Yarvis et al. | |
| 2007/0168520 A1 * | 7/2007 | Perkins et al. ............ | 709/227 |
| 2007/0189249 A1 | 8/2007 | Gurevich et al. | |
| 2007/0253376 A1 * | 11/2007 | Bonta et al. ............... | 370/338 |
| 2008/0232338 A1 * | 9/2008 | Ji et al. ....................... | 370/338 |

OTHER PUBLICATIONS

IEEE 802.11s, "Overview of EMSA," IEEE 802.11s, Section 8.8.1, Nov. 2006, pp. 65-72.
IEEE 802.11i, "IEEE 802.11 and IEEE 802.1X," IEEE 802.11i, Section 5.9, 2004, pp. 14-20.
IEEE 802.1X, "Principles of Operation," IEEE 802.1X, Section 6, Jun. 2001, pp. 7-13.
PCT/US07/74411, "PCT International Search Report," Mailed Jul. 18, 2008, pp. 1-6.

* cited by examiner

Primary Examiner—Phirin Sam
(74) Attorney, Agent, or Firm—Randi L. Karpinia

(57) ABSTRACT

Techniques and technologies are provided for managing establishment, maintenance and removal of security associations (SAs) between nodes in an ad hoc network, such as a wireless mesh network.

38 Claims, 8 Drawing Sheets

MANAGING ESTABLISHMENT AND REMOVAL OF SECURITY ASSOCIATIONS IN A WIRELESS MESH NETWORK

CROSS-REFERENCE TO RELATED APPLICATIONS

This application claims benefit under 35 U.S.C. §119(e) from U.S. Provisional Patent Application Ser. No. 60/835,206, filed Aug. 2, 2006, and entitled "MANAGING ESTABLISHMENT AND REMOVAL OF SECURITY ASSOCIATIONS IN A WIRELESS MESH NETWORK", the contents of which is incorporated herein by reference.

FIELD OF THE INVENTION

The present invention relates generally to communications, and more particularly to techniques for managing establishment and removal of Security Associations (SAs) between nodes in an ad hoc network such as a wireless mesh network.

BACKGROUND

Ad hoc networks are self-forming networks including a number of nodes which can operate with or without any fixed infrastructure, and in some cases the ad hoc network is formed entirely of mobile nodes. An ad hoc network typically includes a number of geographically-distributed, potentially mobile nodes which are wirelessly connected to each other by one or more logical links (e.g., radio frequency communication channels). The nodes can be fixed or mobile and can communicate with each other over a wireless media with or without the support of an infrastructure-based or wired network. Logical links between these nodes can change dynamically in an arbitrary manner as existing nodes move within the ad hoc network, as new nodes join or enter the ad hoc network, or as existing nodes leave or exit the ad hoc network. A single-hop logical link can only exist between two nodes when they are within direct communication range. A multi-hop logical link can only exist between two nodes whenever a set of single-hop logical links can be used to construct a path between the nodes. Such multi-hop logical links are either instantaneously coherent (e.g. all single-hop links are present at the same time) or deferred coherent (e.g. all single-hop links are expected to be present or were present over a period of time).

A node typically includes an ad hoc interface such as an IEEE 802.11 interface which continuously scans for other nodes in its ad hoc network. IEEE 802.11 communication systems allow for "proximity-based" communications. For example, when two nodes are mobile within a geographic area, those nodes can communicate within a range of approximately 50 meters or 165 feet of each other. Nodes can operate in at least two different modes within a network: an autonomous ad hoc mode and an infrastructure mode.

In infrastructure mode, typically only one communication hop is used from a mobile node to an access point (AP) or other base station (e.g., a node with an infrastructure connection). For example, IEEE 802.11 protocols assume that a particular mobile node can rely on the presence of other nodes or access points (APs) in close proximity at any given time. For instance, IEEE 802.11-based protocols assume that the availability of internet access points (APs) which provide nodes in the network with access to different services on, for example, the Internet or other infrastructure.

An autonomous ad hoc network operates in the absence or presence of infrastructure components such as a base station or Wireless Local Area Network (WLAN) access point (AP). In autonomous ad hoc mode, communications single-hop or multi-hop over logical links locally between nodes. Such nodes are sometimes referred to as peer nodes or peers in this context. Processes typically referred to as service discovery or peer discovery can be used so that a particular node can recognize when it encounters another node in its proximity.

Nodes often require authentication for certain secure operations such as when accessing remote databases or networks or before communicating with other nodes.

In prior systems, a centralized authentication procedure is utilized where a single Access Point (AP), such as a base station, handles an authentication process for all nodes within range of the AP. For instance, systems which adhere to American National Standards Institute/Institute of Electrical and Electronics Engineers (ANSI/IEEE) 802.1X or ANSI/IEEE 802.11i standards utilize such a centralized procedure to control access to network resources.

IEEE 802.1X is an IEEE standard initially designed to provide authentication, access control, and key management in both wired and wireless networks. Three entities defined in 802.1X are a Supplicant, an Authenticator and an Authentication Server (AS). The Supplicant is the node seeking authentication and access authorization. The Authenticator or Network Access Server (NAS) is the node with which the Supplicant communicates directly. The AS, sometimes referred to as the Authentication, Authorization and Accounting (AAA) Server, authenticates and grants access, if authorized, to a Supplicant based on the Supplicant's credentials. An AS can be co-located with an Authenticator. Authentication is conducted between the Supplicant and the Authentication Server while the Authenticator acts as a pass-through of the authentication messages. The Authenticator has an uncontrolled port and a controlled port for every client. Before a client is authenticated, only authentication messages are allowed to pass through the uncontrolled port. Only after the Supplicant is successfully authenticated can other traffic be passed via the controlled port.

An exemplary protocol used for these communications between the Supplicant and the Authentication Server is EAP (Extensible Authentication Protocol). For 802.1X, EAP messages between the Supplicant and the Authenticator are encapsulated in EAPOL (EAP over local area network (LAN)) message formats. EAP is flexible and extensible in supporting multiple authentication mechanisms such as user password, certificate based authentication, one time password, authentication token or smart card, and the like. It provides a vehicle to negotiate and use appropriate authentication mechanisms including those which derive keying material at the Supplicant and the AS.

An authentication procedure can begin when a node transmits an authentication request using, for example, an Extensible Authentication Protocol (EAP) comprising EAP Over Local Area Network (EAPOL) packets. The authentication process involves several EAPOL packets being transmitted and received, beginning with an EAP start packet and finishing with either an EAP success message packet or an EAP failure message packet. The authentication server stores the authentication credentials of a mobile device (typically called a Supplicant) that is being authenticated. Authentication servers also can be connected to other authentication servers to obtain Supplicant authentication credentials that are not stored locally.

As described in the "IEEE Standard for Local and metropolitan area networks—Port-Based Network Access Control", IEEE 802.1X-2001, June 2001, Supplicants (or nodes seeking to authenticate and gain access) are assumed to be one hop from the Authenticator (e.g., an access point (AP)) which grants or refuses access. Traditional 802.1X does not contemplate multi-hop communication between the Supplicant and the Authenticator. Because every Supplicant can be authenticated only via an AP, such a centralized procedure might not be practical in ad hoc wireless communication networks that have nodes outside of the wireless communication range of an AP.

Current 802.1X Supplicants of the IEEE 802.11i/Robust Secure Network (RSN) mandatory Authentication Framework are required to be synchronized with the 802.11 Mac-Layer-Management-Entity's (MLME) 3-states model of the IEEE 802.11 standard. The MLME state-machine that represents the 802.11 topology relationship is the function that drives 802.1X security association establishment. Within this framework, the 802.1X-Supplicant is triggered by MLME change-of-state events. The information needed for the 802.1X security association, like AP identity and capabilities, is provided to the 802.1X Supplicant entity by MLME events. However 802.11 MLME does not support AP-to-AP topology relationships such as those used in multi-hop infrastructure or multi-hop ad hoc networks.

IEEE 802.11s describes security establishment based on MLME processes, and provides two different models which can be used during security association establishment: the distributed 802.1X model, and the centralized-802.1X model. In both the distributed 802.1X model and the centralized-802.1X model, establishment of security associations between neighbors is performed independently of each other's 802.1X state; and neither model contemplates the use of real-time neighbor and multi-hop information used to create security associations between nodes. Because IEEE 802.11 MLME does not support AP-to-AP topology relationships, such as those used in an 802.11s multi-hop network, real-time neighbor node and multi-hop information is unavailable for security association establishment and removal. Furthermore, the MLME defined state machine does not take into consideration the needed synchronization between real-time neighbor events and security association states.

IEEE 802.11i also specifies rules/procedures for removal of security associations. Security associations are removed according to specific MLME events of the 802.11 protocol. However, the MLME does not take into account the AP-to-AP topology relationships that exist in ever changing multi-hop ad hoc and infrastructure networks.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
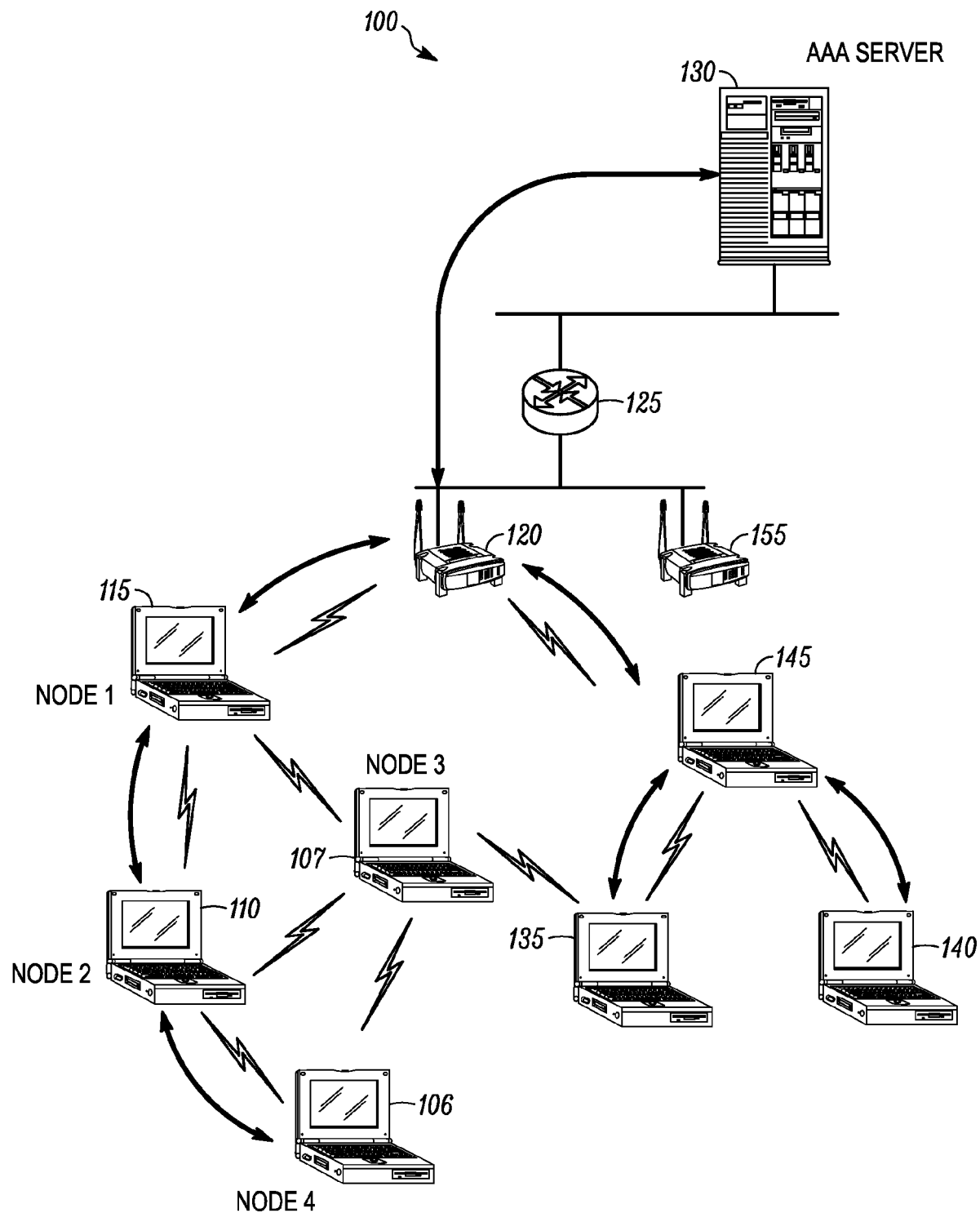
FIG. 1 is a simplified representation of an exemplary ad hoc network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail various embodiments that are in accordance with the present invention, it should be observed that the embodiments reside primarily in combinations of method steps and apparatus components related to establishing and removing security associations between pairs of neighboring nodes. Accordingly, the apparatus components and method steps have been represented where appropriate by conventional symbols in the drawings, illustrating only those specific details that are pertinent to understanding the embodiments of the present invention, so as not to obscure the disclosure with details that will be readily apparent to those of ordinary skill in the art having the benefit of the description herein.

In this document, relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . ." does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for establishing and removing security associations between pairs of neighboring nodes as described herein.

The non-processor circuits may include, but are not limited to, a radio receiver, a radio transmitter, signal drivers, clock circuits, power source circuits, and user input devices. As such, these functions may be interpreted as steps of a method for establishing and removing security associations between pairs of neighboring nodes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a simplified representation of an exemplary ad hoc network 100. The ad hoc network 100 comprises a plurality of nodes, 106, 107, 110, 115, 135, 140, 145, one or more intelligent access points (IAPs) 120, 155, a router 125, and an AAA server 130. The infrastructure portion of the network includes the IAPs 120, 155 which are coupled to the AAA server 130 via the router 125. In this exemplary network configuration, Node1 115 and Node 145 are one hop from the IAP 120, Node2 110, Node3 107, Node 135 and Node 140 are two hops from the IAP 120, and node 106 is three hops from the IAP 120.

As described above, each node in the network establishes a trust relationship with the AAA Server 130 deployment. This can be based on, for example, a password, a subscriber identity module (SIM) card identification (I.D.) or other I.D. which is unique to the particular node and is stored at the AAA Server 130. Each node uses this relationship with the AAA Server 130 to authenticate to that AAA Server 130. The AAA Server 130 (or the IAP 120) also helps the particular node that is authenticating to establish a trust relationship with its neighbor nodes by distributing a shared secret that is encrypted and that can only be decrypted by that particular node and its immediate neighbor through which it hopped through to authenticate.

For example, the nodes 106, 107, 110, 115, 135, 140, 145 can each independently establish a "pairwise master key (PMK)" by authenticating with the AAA server 130. This unique PMK is a pairwise secret that is derived only by the node and the AAA server 130. For example, in one exemplary implementation, Node1 115 transmits a first authentication request to the AAA server 130 via the IAP 120. The AAA server 130 authenticates Node1 115, and Node1 115 and AAA server 130 simultaneously derive a pairwise master key (PMK). Although not shown, it will be appreciated that this authentication process can also happen between the AAA server 130 and each of the other nodes 145, 110, 107, 135, 140, 106. The AAA server 130 securely transmits the PMKs to the IAP 120 which then transmits the PMKs only to the 802.1x-Authenticator nodes for which they are intended. Thus, at this point, the nodes have authenticated to the AAA server 130 via the IAP 120 and established PMKs. As will be described below, the PMKs can then be used to derive more pairwise secrets (or "temporal keys") for data or routing protection.

In many cases, a node must establish a trust relationship with a neighbor node over the radio interface before it can start to communicate with or through that neighbor node. Establishing a security association between these two peer nodes assures the source node that the neighbor node is trusted, and at the same time assures the neighbor-node that the source node is allowed to access the network. One of the underlying problems in a mesh network relates to managing which neighbor node(s) a particular node will establish and maintain a security association with. Some of these neighbor nodes may be fixed, while other neighbor nodes may be mobile. For communication between peer nodes it is important to synchronize the security association state with the routing module since the routing module can not establish a route to a new neighbor "peer" node unless a security association is first established with that neighbor node.

IEEE 802.1X "Supplicants" are synchronized according to the Mac-Layer-Management-Entity's (MLME) "3-states" model. The MLME 3-states model will be described below with respect to FIG. 2.

Figure 2:
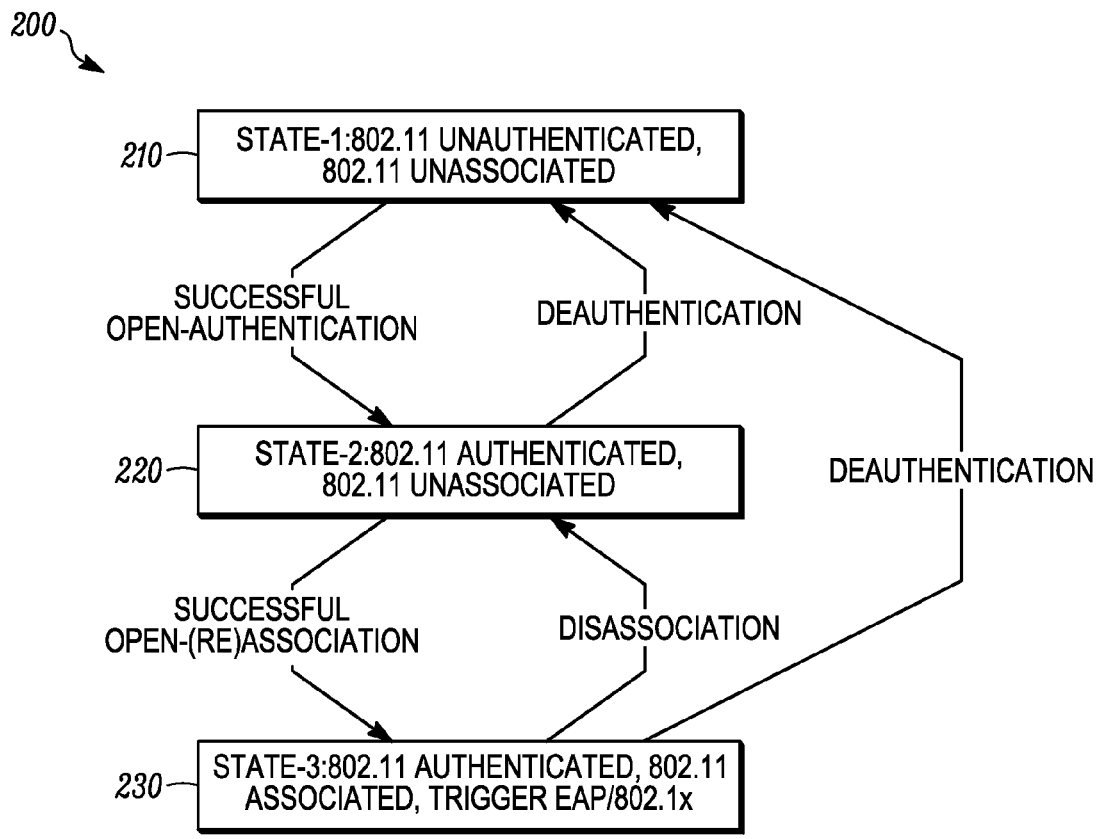
FIG. 2 is a Unified Modeling Language (UML) state diagram showing an IEEE 802.11 3-State MLME authentication/association and de-authentication/disassociation processes performed by a node/AP pair.

FIG. 2 is a Unified Modeling Language (UML) state diagram illustrating an IEEE 802.11 authentication/association and de-authentication/disassociation processes performed by a node/AP pair. The state diagram of FIG. 2 shows three states 210-230 which the node/AP pair maintains in its MLME as the node authenticates/associates and disassociates/de-authenticates with the AP. In IEEE 802.11 networks, these states are the triggers for establishment and removal of security associations.

At step 210, the node is in State 1. In State 1, the node has not yet 802.11 authenticated (e.g., is unauthenticated) or 802.11 associated (e.g., is unassociated) with the AP. Upon successfully authenticating with the AP, at step 220, the node enters State 2. In State 2, the node has 802.11 authenticated (e.g., is authenticated), but has not yet 802.11 associated (e.g., is unassociated) with the AP. Upon successfully associating with the AP, at step 230, the node enters State 3. In State 3, the node has 802.11 authenticated (e.g., is authenticated), and 802.11 associated (e.g., is associated) with the AP. This triggers the Extensible Authentication Protocol (EAP) described above, and establishment of a security association, for example, using 802.1X.

The MLME state-machine drives/triggers establishment of 802.1X security associations. The 802.1X-Supplicant is actively triggered by MLME change-of-state notifications. All the information needed for the 802.1X security association is provided to the 802.1X-Supplicant by the MLME notifications/events as will now be described with reference to FIG. 3.

Figure 3:
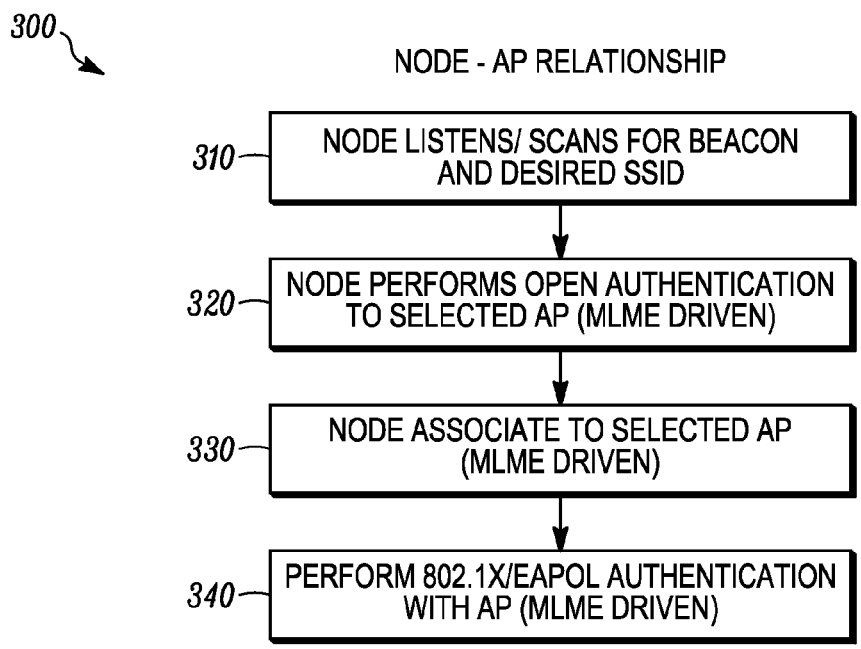
FIG. 3 is a flowchart showing an 802.11 authentication/association process performed by a node/AP pair.

FIG. 3 is a flowchart illustrating an 802.11 authentication/association process 300 performed by a node/AP pair, in compliance with states depicted in FIG. 2.

At step 310, the node scans for a beacon and a desired Service Set Identifier (SSID). At step 320, the node authenticates with the AP having the desired SSID. This authentication is sometimes referred to as "open authentication," and is driven by the MLME of the node and the AP. At step 330, the node associates to the AP having the desired SSID. Again, this association process is driven by the MLME. At step 340, the MLME of the node triggers the Extensible Authentication Protocol (EAP) described above. The node and AP perform an EAP Authentication to establish of a security association between the node and the AP, for example, using 802.1X.

Currently, IEEE 802.11 standards do not address security association establishment among peer nodes in a mesh network. For instance, the MLME does not support AP-to-AP topology relationships such as those which occur in a mesh network. It is desirable to provide security association establishment techniques which do not rely on the 802.11 MLME 3-state model since many routing modules used in peer mesh nodes do not support the notion of "association" or "open authentication" which is essential to the MLME management operation. As such, with respect to peer "mesh" nodes, it is desirable to provide security association establishment techniques in which the security association state is synchronized with the routing module.

A security association between a pair of node can help to provide for secure communications between those nodes. Techniques are provided herein for establishing security associations between nodes, maintaining security associations between nodes, and removing security associations between nodes in an ad hoc network such as a wireless mesh network. As used herein, the term "security association" refers to a set of policy(ies) and key(s) used to protect information. A security association can comprise information regarding, for example, key material (e.g., cryptographic keys), type of encryption/decryption or cipher algorithm, key length, MAC algorithm, counters, timers, etc. needed for correct operation. For example, components of a security association in the context of IEEE 802.11i can include: a pairwise master key (PMK) which is derived during EAP authentication between the Supplicant and the Authentication Server (e.g., derived from the 802.1x/EAP exchange), a pairwise transient key (PTK) which is derived between peer nodes using the PMK during an IEEE 802.11i 4-way handshake, and a group transient key (GTK) which is derived during an 802.11i 2-way handshake or optionally piggybacked on 4-way handshake as defined in 802.11i using the PMK. The security associations for each of the PMK, PTK and GTK include key material, cipher algorithm, counters, timers, etc.

The information in the security association is stored by each party of the security association, is consistent among all parties, and has an identity. Examples of such techniques will be described below with reference to FIGS. 5, 6 and 10. Prior to describing these techniques, a brief description of a generic node will be provided with reference to FIG. 4.

Figure 4:
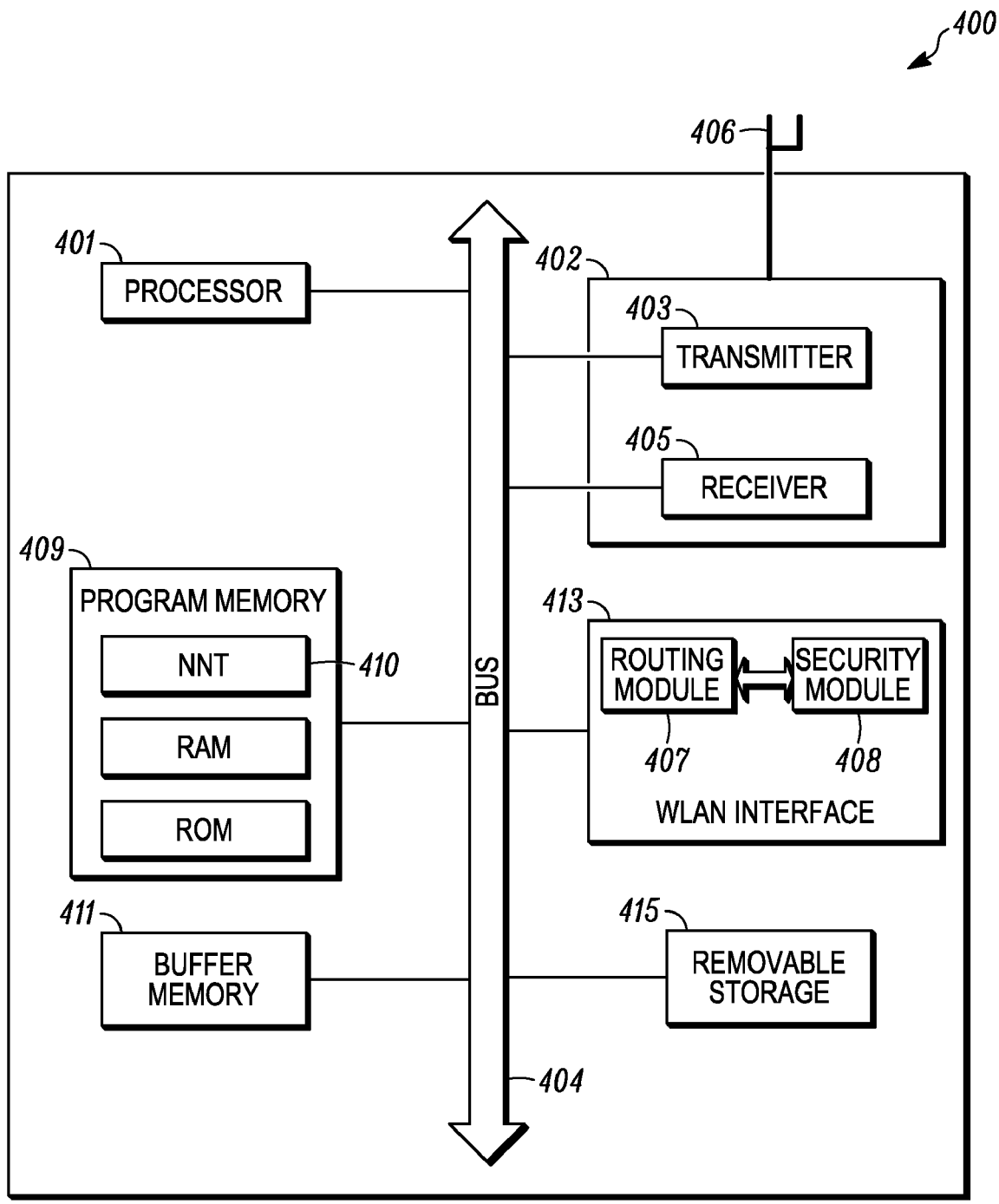
FIG. 4 is a block diagram of an exemplary node according to one exemplary implementation.

FIG. 4 is a block diagram of an exemplary node 400 according to one exemplary implementation. The node 400 comprises a processor 401, a transceiver 402 including a transmitter circuitry 403 and a receiver circuitry 405, an antenna 406, a program memory 409 for storing operating instructions that are executed by the processor 401, a buffer memory 411, and one or more communication interfaces including a wireless local area network (WLAN) interface 413 comprising a routing module 407 and a security module 408. Although not shown, the node 400 also can include an antenna switch, duplexer, circulator, or other highly isolative means (not shown) for intermittently providing information packets from the transmitter circuitry 403 to the antenna 406 and from the antenna 406 to the receiver circuitry 405. The node 400 is an integrated unit containing at least all the elements depicted in FIG. 4, as well as any other elements necessary for the node 400 to perform its particular electronic function. Alternatively, the node 400 can comprise a collection of appropriately interconnected units or devices, wherein such units or devices perform functions that are equivalent to the functions performed by the elements of the node 400.

The processor 401 includes one or more microprocessors, microcontrollers, DSPs (digital signal processors), state machines, logic circuitry, or any other device or devices that process information based on operational or programming instructions. Such operational or programming instructions are stored in the program memory 409. The program memory 409 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 401 has one or more of its functions performed by a state machine or logic circuitry, the memory 409 containing the corresponding operational instructions can be embedded within the state machine or logic circuitry. The operations performed by the processor 401 and the other elements of the node 400 are described in detail below.

The transmitter circuitry 403 and the receiver circuitry 405 enable the node 400 to communicate information packets to and acquire information packets from the other nodes. In this regard, the transmitter circuitry 403 and the receiver circuitry 405 include appropriate, conventional circuitry to enable digital or analog transmissions over a wireless communication channel. The transmitter circuitry 403 and the receiver circuitry 405 can operate over an ad hoc networking air interface (e.g., Bluetooth, IEEE 802.11, IEEE 802.15, and the like).

The implementations of the transmitter circuitry 403 and the receiver circuitry 405 depend on the implementation of the node 400. For example, the transmitter circuitry 403 and the receiver circuitry 405 can be implemented as an appropriate wireless modem, or as conventional transmitting and receiving components of two-way wireless communication devices. In the event that the transmitter circuitry 403 and the receiver circuitry 405 are implemented as a wireless modem, the modem can be internal to the node 400 or insertable into the node 400 (e.g., embodied in a wireless radio frequency (RF) modem implemented on a Personal Computer Memory Card International Association (PCMCIA) card). For a wireless communication device, the transmitter circuitry 403 and the receiver circuitry 405 are preferably implemented as part of the wireless device hardware and software architecture in accordance with known techniques. One of ordinary skill in the art will recognize that most, if not all, of the functions of the transmitter circuitry 403 and/or the receiver circuitry 405 can be implemented in a processor, such as the processor 401. However, the processor 401, the transmitter circuitry 403, and the receiver circuitry 405 have been artificially partitioned herein to facilitate a better understanding.

The receiver circuitry 405 is capable of receiving radio frequency (RF) signals from at least one frequency band and optionally multiple frequency bands, when, for example, the communications with the proximate device are in a frequency band other than that of the network communications. The receiver circuitry 405 can optionally comprise a first receiver and a second receiver, or one receiver capable of receiving in two or more frequency bands. The receiver 405, depending on the mode of operation, can be tuned to receive, for example, Bluetooth or wireless local area network (WLAN), such as IEEE 802.11, communication signals. The transceiver 402 includes at least one set of transmitter circuitry 403. The at least one transmitter 403 can be capable of transmitting to multiple devices potentially in multiple frequency bands.

The antenna 406 comprises any known or developed structure for radiating and receiving electromagnetic energy in the frequency range containing the wireless carrier frequencies.

The buffer memory 411 can be any form of volatile memory, such as random access memory (RAM), and is used for temporarily storing received information packets in accordance with the present invention. As illustrated in FIG. 4, the routing module 407 and the security module 408 are communicatively coupled. The routing module 407 triggers establishment of security associations based on attributes in a neighbor node table. Depending upon the implementation, some examples of some of the attributes stored in the neighbor node table include a neighbor node list, an active route list and a proxy list, and parameters such as Link Quality Measurements (LQMs) (which account for the quality of a wireless link with the particular neighbor node), routing metrics (which account for metrics along a route to the particular neighbor node), mobility domain information comprising a mobility domain value advertised by the particular neighbor node, mobility information about the particular neighbor node; and security association state information The routing module 407 controls which neighbor nodes the security module 408 establishes security associations with. Instead of using a MAC Layer Management Entity (MLME) to establish security associations, the establishment of security associations (to specific neighbor nodes in a mesh network) can be triggered based on the routing module's observation of a set of attributes in a neighbor node table. For example, in one implementation, the routing module 407 triggers the security module 408 to establish security associations to specific neighbors based on attributes such as Link Quality Measurements (LQMs), routing metrics, mobility domain information, mobility information about the pair of peer nodes (e.g., fixed or mobile) and whether or not a security association is already established with a neighbor node. Thus, these security association establishment techniques are not dependent on the MLME or its association and open authentication states.

Security association establishment and removal techniques will be discussed below with respect to FIGS. 5-10.

Security Association (SA) Establishment

Figure 5:
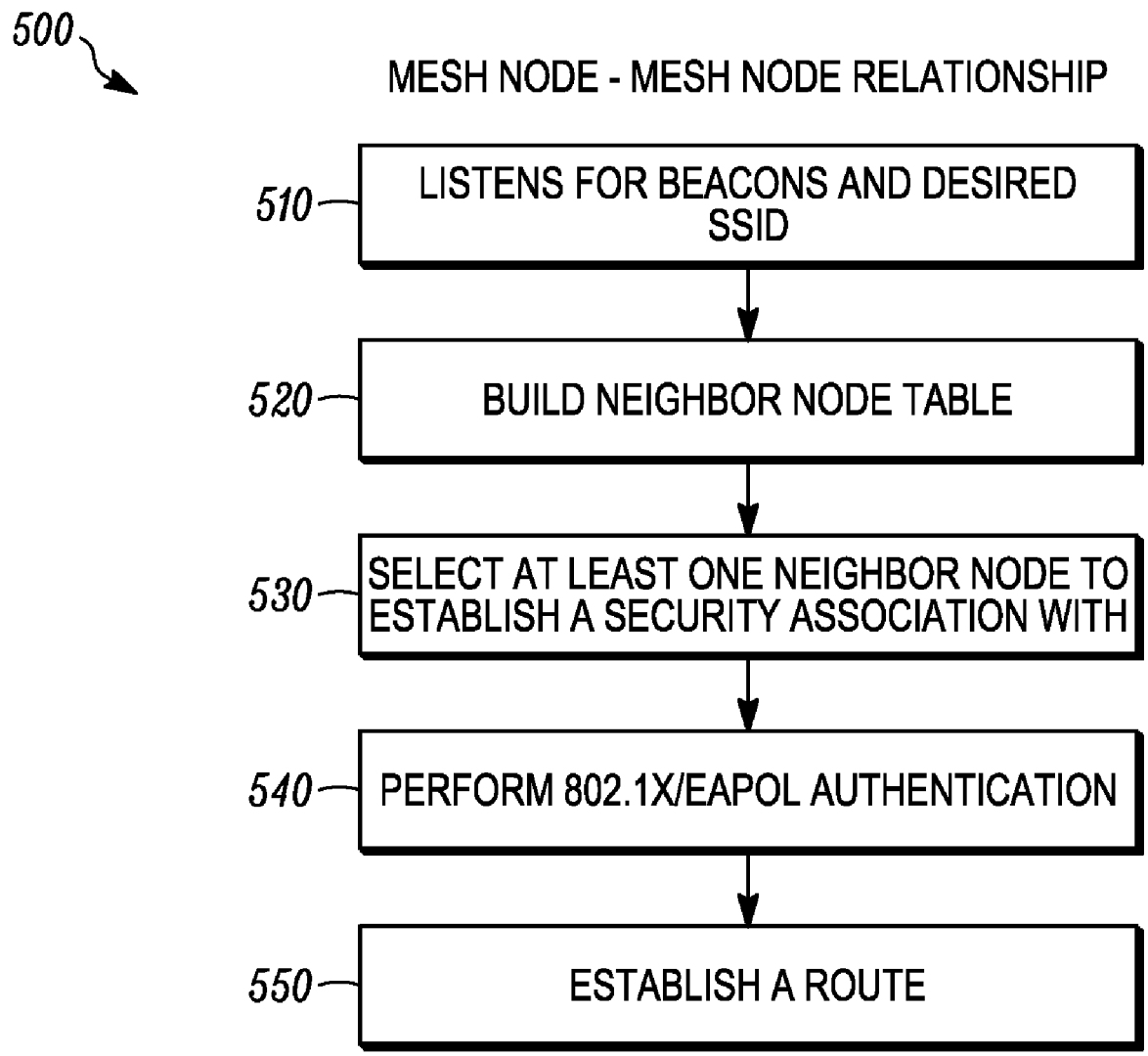
FIG. 5 is a flowchart showing a peer-node basic procedures and security association establishment process for establishing a security association between a pair of peer mesh nodes in a mesh network according to one exemplary implementation of some embodiments of the invention.

FIG. 5 is a flowchart illustrating a security association establishment process 500 for establishing a security association between a pair of peer "mesh" nodes in a mesh network according to one exemplary implementation. In this implementation, a neighbor node table can be used to manage establishment of security associations with other neighbor nodes. A routing module and a neighbor node table management entity are used to control of security association establishment by synchronizing security associations and neighbor node table.

At step 510, a node detects the presence of neighbor nodes within its communication range. For example, in one implementation, upon power up the node listens or scans for messages such as a management frame, beacon or other regularly transmitted or periodic message (e.g., presence messages, HELLO messages) and desired Service Set Identifiers (SSIDs).

At step 520, a routing module of the node builds a neighbor node table by populating the neighbor node table with information about the neighbor nodes it detects at step 510.

At step 530, the routing module of the node selects a particular neighbor node from the neighbor table. The routing module can select one of the neighbor nodes based on attributes such as Link Quality Measurements (LQMs), routing metrics, mobility domain information, mobility information about the pair of peer nodes (e.g., fixed, stationary or mobile). For example, from the neighbor list the routing module can determine, for example, that the node has four fixed neighbors and five mobile neighbors. Of the four fixed neighbors the node can determine that two are from the same mobility domain and two of them are bound to the same AP. The routing module can select one or more of the neighbor nodes to establish a security association with based on this information (e.g., based on which neighbor node has the best path to the AP), and can then eventually try to establish a route to the selected neighbor node.

At step 540, the routing module of the node triggers the security module to establish a security association with the selected neighbor node(s). The security module can use any known protocol to establish a security association with the selected neighbor node(s). For example, in one implementation, the security module can use the Extensible Authentication Protocol (EAP) described previously herein. In this implementation, the node and the selected neighbor node can perform an 802.11i/EAPOL exchange to establish a security association between the node and the selected neighbor node. In one implementation, if the node and the selected neighbor node successfully establish security association, then the security module informs the routing module and a "security association-established-to-neighbor" flag is set in the neighbor list.

After the security association is established, at step 550, the routing module of the node can then establish a route between the node and the selected neighbor node. Alternative or back-up routes can be quickly established using fast-handoff solutions for inter-mobility domain handoffs. This can be done a priori (e.g., establish parallel security associations) or the back-up security association(s) can be done at time of failure. To minimize traffic overhead and the management of "short-lived security associations," the node can establish security associations to the "best neighbor" only. Significantly, no MLME involvement is required.

Figure 6:
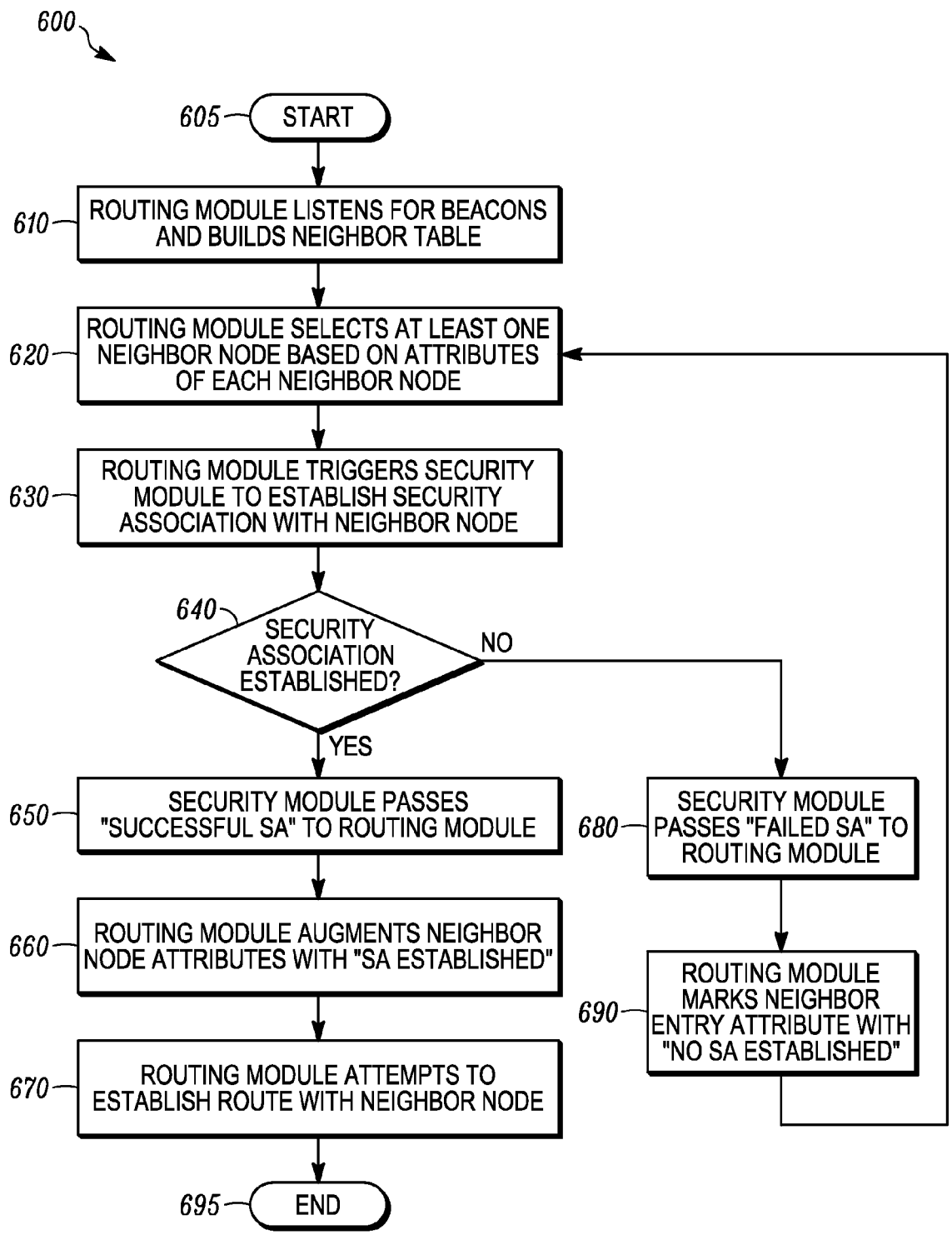
FIG. 6 is a flowchart showing another security association establishment process for establishing a security association between a pair of peer mesh nodes in a mesh network according to another exemplary implementation of some embodiments of the invention.

FIG. 6 is a flowchart illustrating a security association establishment process 600 for establishing a security association between a pair of peer mesh nodes in a mesh network according to another exemplary implementation.

The process 600 starts at step 605. At step 610, a node detects the presence of neighbor "peer mesh" nodes within its communication range, and upon detecting the beacons, a routing module of the node, using information in those beacons, builds a neighbor node table based on the received beacons. For example, in one implementation, upon power up the node listens or scans for beacons (e.g., HELLO messages) and desired Service Set Identifiers (SSIDs) associated with peer mesh nodes.

At step 620, the routing module of the node selects a neighbor node or nodes from the neighbor table based on a number of factors, such as, Link Quality Measurements (LQMs) for the neighbor nodes, mobility domains of the neighbor nodes, routing metrics for the neighbor nodes, mobility information about the node and the neighbor nodes (e.g., whether the nodes are fixed, stationary or mobile), and whether a security association exists for the neighbor nodes. The routing module uses the factors or attributes to determine and select the optimal or "best" neighbor node. The node will eventually try to establish a route to the selected neighbor node(s). In an alternative implementation, if the routing module selects a neighbor node with which it has already established security association, then process 600 can directly proceed to step 670 without conducting steps 630-660.

At step 630, the routing module sends a message (e.g., a message internal to the node) to the security module to trigger the security module to begin the process of establishing a security association between the node and the selected neighbor node(s). The process of establishing a security association with a neighbor node can involve deriving keying material from an existing master key (e.g., pre-shared key or cached master key from prior authentication exchange) or can involve deriving the master key. Deriving a master key involves using any number of known protocols, including EAP based methods such as Protected Extensible Authentication Protocol (PEAP), EAP-Tunneled Transport Layer Security (EAP-TTLS), Transport Layer Security (TLS) and Lightweight Extensible Authentication Protocol (LEAP). Deriving a specific security association between the node and the selected neighbor node can use a number of protocols, for example, an 802.11i 4-way handshake, a wireless fidelity (WiFi) Protected Access (WPA) exchange or a Wired Equivalent Privacy (WEP) exchange.

At step 640, the node determines whether a security association between the node and the selected neighbor node(s) has been successfully established (e.g., whether establishment of a security association was a success or failure).

If the node and the selected neighbor node(s) successfully establish security association between the node and the selected neighbor node(s), then at step 650, the security module passes the security association information to the routing module via an internal message (e.g., a message within the node). At step 660, the routing module adds/updates the entry in the neighbor table for the selected neighbor node with the security association information such that the entry in the neighbor table for the selected neighbor node indicates that the node and the selected neighbor node share a security association. At step 670, the routing module of the node establishes a route between the node and the selected neighbor node. The process then ends at step 695.

If the node and the selected neighbor node are unable to successfully establish security association at step 640, then at step 680, the security module passes the failed security association information to the routing module. At step 690, the routing module adds/updates the entry in the neighbor table for the selected neighbor node with the failed security association information such that the entry in the neighbor table for the selected neighbor node indicates that the node and the selected neighbor node do not share a security association. The process 600 then loops back to step 620, where the routing module attempts to select another neighbor node from the neighbor table.

It will be appreciated by those of ordinary skill in the art, that in a mesh network, security associations are established with multiple neighbors based on mesh neighbor discovery/routing processes. As such, changes in the mesh topology are more likely to determine when a particular security association needs to be removed. Thus, in a meshed WLAN network one of the underlying problems is knowing when to remove an existing Security Association with a neighbor.

It would be desirable to synchronize management of security associations with routing table information and neighbor lists used by the routing module. It would be desirable to provide techniques which can allow a peer node in a mesh network to determine when to delete or remove security association information that has become "stale."

Security Association (SA) Removal

As discussed above, peer nodes in a mesh network do not have a Media Access Control (MAC) policy management definition for security association states. Techniques are provided which define a removal policy for peer nodes in a mesh network that do not have a MAC policy for management of security association states. Two exemplary implementations of these techniques will now be described below with reference to FIGS. 7-8.

Figure 7:
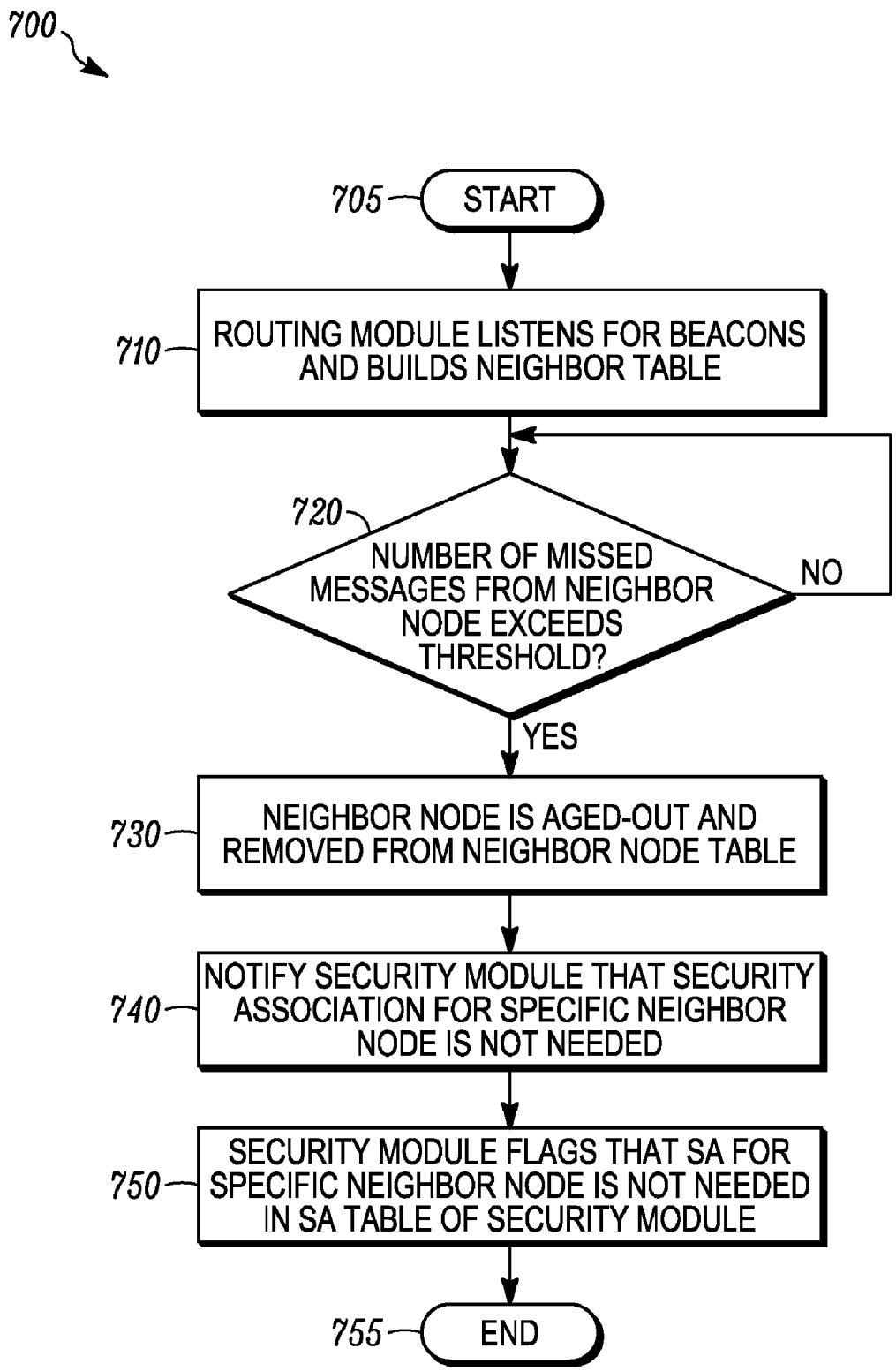
FIG. 7 is a flowchart showing a process performed by a peer node in a mesh network for removing a security association stored by the peer node according to an exemplary implementation of some embodiments of the invention.

FIG. 7 is a flowchart illustrating a process 700 performed by a peer node in a mesh network for removing a security association stored by the peer node according to an exemplary implementation. In this implementation a routing module uses information contained in the node's neighbor node table regarding communications with a particular neighbor node to determine whether a particular security association with that particular neighbor node should be deleted or removed. For example, a particular security association (e.g., derived pair-wise key material of the security association) with a particular neighbor node can be deleted or removed from a neighbor node table if a processor determines that the particular neighbor node no longer exists, for example, in either the neighbor node table, active route list or proxy list of the neighbor node table. The node removes the particular neighbor node from the neighbor node table, and triggers the security module to remove the corresponding security association (e.g., deletion of derived pair-wise key material). The process 700 provides a method to manage the deletion/removal of security associations between nodes, thus substituting for the lack of an 802.11i MLME policy.

The process 700 starts at step 705. At step 710, a node detects the presence of neighbor nodes within its communication range based on a message received from the neighbor node, and upon detecting the presence of neighbor nodes, the routing module of the node, using information in those messages, builds a neighbor table. The messages may generally comprise one of a beacon-type message (e.g., 802.11 beacon-type message), a Hello message, management frames, neighbor advertisement lists, etc. For example, in one implementation, upon power up the node listens or scans for messages (e.g., management frames such as beacons, HELLO messages) and desired Service Set Identifiers (SSIDs) associated with peer mesh nodes. The routing module of the node stores a neighbor table with entries for a number of neighbor nodes. The entries for each node can include a number of factors, such as, Link Quality Measurements (LQMs) for the particular neighbor node, mobility domain of the particular neighbor node, routing metrics associated with the particular neighbor node, mobility information about the particular neighbor node (e.g., whether the particular neighbor node is fixed, stationary or mobile), and security association information which indicates whether the node has established a security association with the particular neighbor node.

To determine which security associations are "stale" and should be removed from the neighbor table, at step 720, the node checks the neighbor node table and determines, for each particular neighbor node, if a number of "missed messages" (or other regularly or periodically transmitted messages) from the particular neighbor node exceeds a threshold number. The missed messages can be any messages a node regularly transmits, such as, announcement messages (e.g., beacon messages, Hello messages), advertisement messages, status messages, presence messages, periodic messages, etc. If the number of missed messages from the particular neighbor node does not exceed the threshold number, then the node maintains the security association information for that particular neighbor node in the neighbor table.

If the number of missed Hello messages from the particular neighbor node exceeds the threshold number, then at step 730, the node determines that the particular neighbor node has "aged-out," and decides that the particular neighbor node should be removed from the neighbor node table. At step 740, the routing module of the node sends a message to the security module to notify the security module that the security association for the particular neighbor node is not needed. In one implementation, the message indicates that the security module should remove the security association information for that particular neighbor node.

At step 750, the security module flags that the security association for the particular neighbor node is not needed in a security association table of the security module. In some situations, it is prudent to maintain, but not immediately remove, the stale security associations since some particular security associations may be needed within a short time period even though the routing module has removed the corresponding neighbor node from the neighbor node table. As such, in one implementation, the security module can remove or delete the security association information for that particular neighbor node from the security association table, whereas in other implementations the security module retains the stale security associations for future use. The process 700 ends at step 755.

Figure 8:
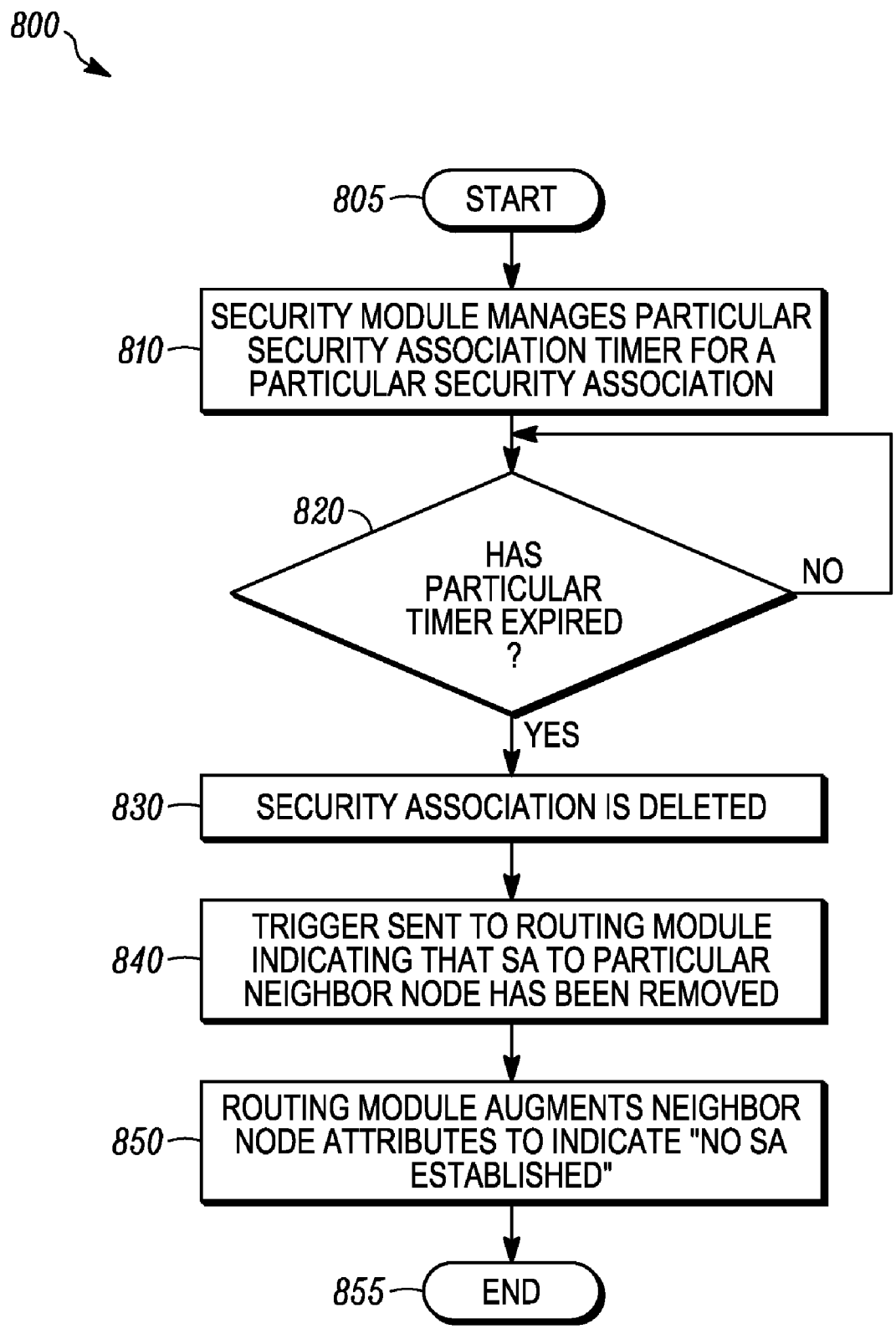
FIG. 8 is a flowchart illustrating another process performed by a peer node in a mesh network for removing a security association stored by the peer node according to another exemplary implementation of some embodiments of the invention.

FIG. 8 is a flowchart illustrating a process 800 performed by a peer node in a mesh network for removing a security association stored by the peer node according to another exemplary implementation. The security module includes a security association table which stores security associations the node has with other nodes. The security association table is maintained separately from the neighbor node table and/or other tables which are maintained by the routing module. The security association table can include information regarding the security association state, timers, etc. which are associated with a particular security association. In this implementation, a security module in the node uses timers and age-out policies to determine whether a particular security association (with a particular neighbor node) should be deleted or removed. In one implementation, an age-out policy (e.g. lifetime of the pair-wise master key (PMK) expires) causes the deletion of all derived keys in the PMK hierarchy (e.g., deletion of PMK and pair-wise transient key (PTK) and Group transient key (GTK) security associations). Upon deletion of the particular security association, the security module informs the routing module that the particular security association to the particular neighbor node no longer exists to trigger changes to the neighbor list state in the routing module. The routing module then knows the security association to the particular neighbor node is no longer valid. One skilled in the art will appreciate that this information regarding the security association state is useful for subsequent decisions made by the routing module regarding which neighbor(s) to establish a route with.

The process 800 starts at step 805. At step 810, a security module in the node manages timers associated with each security association stored in the neighbor table. In one implementation, a "lifetime" timer runs from the time the security association is established for a fixed duration, and at expiration of the timer the security association will be removed or deleted from the security association table. In another implementation, an "idle" timer has a fixed duration and runs from the time the security association is established or updated, and is reset each time the timer is updated. If the timer is not reset before the timer expires (e.g., is idle for too long a period), then the security association will be removed or deleted from the security association table. In other implementations, other types of timers or combinations of timers can also be utilized.

At step 820, the security module determines if the timer has expired. If the timer has not expired, then the process 800 loops back to step 820. If the timer has expired, then at step 830, the security module removes or relates the particular security association associated with that particular timer.

At step 840, the security module of the node sends a message to the routing module of the node (or other module that manages the neighbor list) indicating that the security association information for that particular neighbor node has been removed from the security module. At step 850, the routing module of the node (or other module that manages the neighbor list) augments the neighbor node attributes to indicate that "no security association established". The process 800 ends at step 855.

Figure 9:
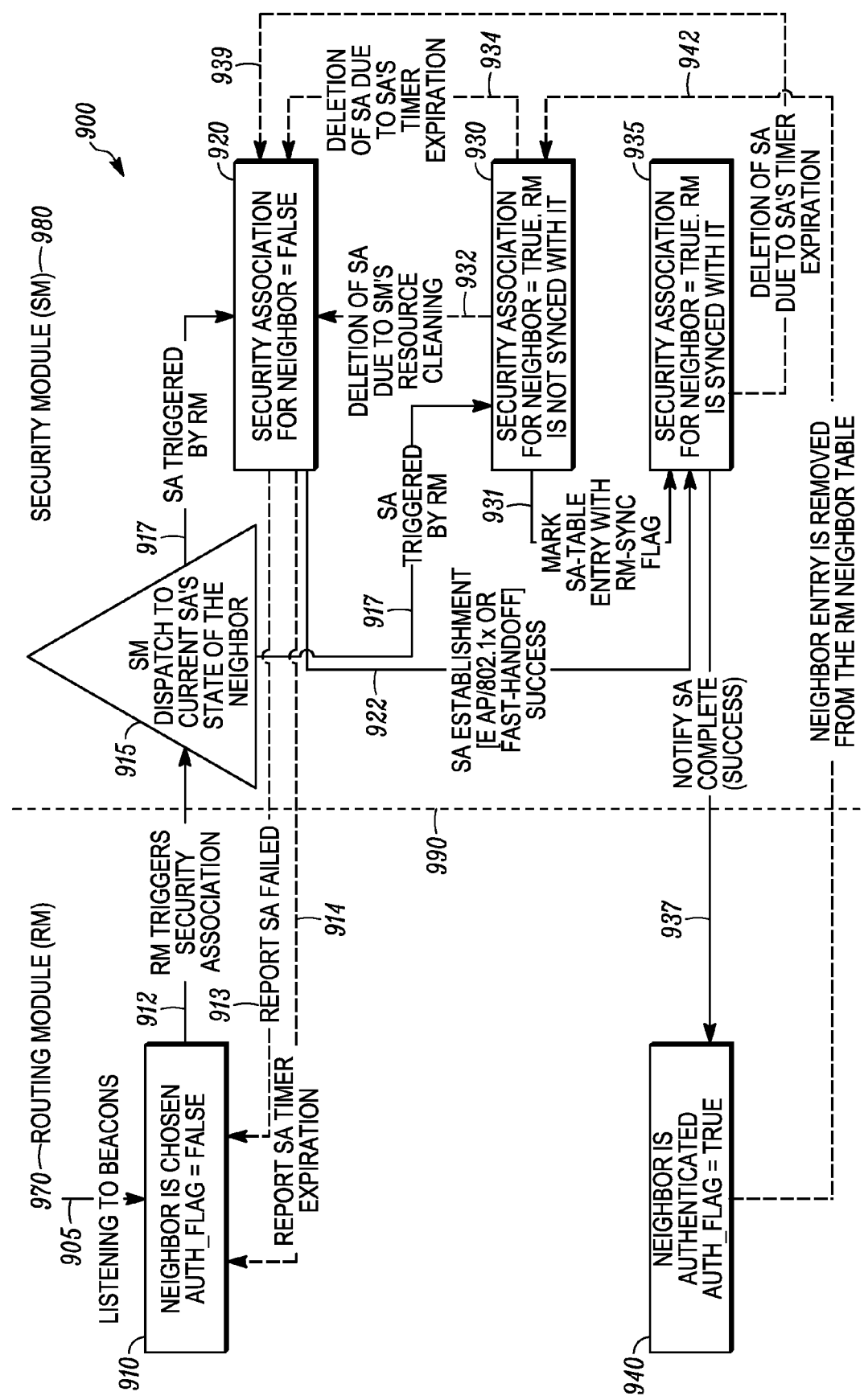
FIG. 9 is a UML state diagram illustrating interactions of a routing module and a security module of a node during security association establishment and security association removal between pair of peer nodes in a network in accordance with some embodiments of the invention.

FIG. 9 is a Unified Modeling Language (UML) state diagram 900 illustrating interactions of a routing module 970 and a security module 980 of a node during security association establishment and security association removal between pair of peer nodes in a network in accordance with some embodiments of the invention.

Nodes belonging to a particular network run the processes shown in FIG. 9. In FIG. 9, the dotted-line 990 represents an interface between a routing module (RM) 970 of a node and a security module (SM) 980 of that same node. The state diagram comprises a number of states 910, 920, 930, 935, 940 and a number of arcs 905, 912-914, 917, 922, 931, 932, 934, 937, 939, 942 between those states 910, 920, 930, 935, 940. States 910 and 940 represent states of the routing module 970 of the node, whereas states 920, 930 and 935 represent states of security module 980 in a Medium Access Control (MAC) engine of the node. Triangular symbol represents a dispatch function 915 within the security module 980. Arcs between the different states can be read either as the expiration of a timer or a signal that has been passed between the routing module 970 and the security module 980 and/or neighbor node table during execution of the state machine of FIG. 9.

At state 905, the routing module 970 of the node receives beacon massages from other nodes in the network. At state 910, the routing module 970 of the node has chosen or selected a particular neighbor node (or selected neighbor node), and a first flag (AUTH_FLAG) is set to FALSE indicating that the particular neighbor node has not yet been authenticated. The trigger security association arc 912 represents the messages sent by the routing module 970 of a node to the security module 980 of the node when the routing module 970 decides to begin the process of establishing a security association between the node and the particular neighbor node. Upon receiving a message associated with the trigger security association arc 912, the dispatch function 915 sends a message (represented via arc 917) to the security module 980 that triggers security association establishment which results in a transition to either state 920 or 930, depending upon the state of the security association in the security module 980.

At state 920, the node and the particular neighbor node (or selected neighbor node) have not yet been authenticated with one another. The security association failure arc 913 represents the messages sent by the security module 980 of the node to the routing module 970 of the same node when the security module 980 determines that the process of establishing a security association between the node and the particular neighbor node has failed. The security association establishment arc 922 represents a successful establishment of a security association with a specified neighbor node. The security association establishment arc 922 results in the security module 980 transitioning to state 935.

The dispatcher function 915 places the security module 980 in state 930 upon reception of a security association trigger message (arc 912) from the routing module 970 for a neighbor node that has an existing security association. At state 930, the node and the particular neighbor node (or selected neighbor node) have been authenticated with one another, however the routing module 970 and security module 980 are out of synchronization.

The security module 980 transitions out of state 930 by arcs 931, 932 and 934. When the security association table reflects synchronization with the routing module 970 (an event shown by arc 931), the security module 980 enters state 935. At state 935, the security association for the particular neighbor node is set to true, and the state of the security association in the routing module 970 is in synchronization with the state of the security association in the security module 980. Arcs 932 and 934 represent events resulting in the security module 980 entering a false security association for neighbor state 920. Arc 932 represents an event that results in the deletion of a security association due to security module 980 resource maintenance (e.g., reclaiming memory by deleting security associations no longer needed by the routing module 970). Arc 934 represents expiration of a security association timer in the security module 980. When a security association timer expires, as shown by arc 934, the security module 980 enters state 920 resulting in the deletion of a security association (e.g., expiration of a PMK timer can result in the deletion of the PMK security association and derived PTK and GTK security association).

At state 935, the security association for the particular neighbor node is set to true, and the state of the security association in the routing module 970 is in synchronization with the state of the security association in the security module 980. As represented by arc 937, a security association exists for the specific neighbor and the routing module 970 is informed of the security association. As shown by arc 939, when a security association timer expires for a specific neighbor node, the security association is deleted for the neighbor node and the security module 980 enters state 920. The remove security association arc 914 represents the messages sent by the security module 980 of the node to the routing module 970 of the same node when the security module 980 determines that the timer associated with the security association between the node and the particular neighbor node has expired. As represented by remove security association arc 914, state 920 informs the routing module 970 of the security association deletion for the specific neighbor node.

At state 940, the routing module 970 of the node sets the first flag (AUTH_FLAG) to TRUE indicating that the particular neighbor node has been authenticated and a security association between the node and the particular neighbor node has been established. Arc 934 represents the messages sent by the routing module 970 of the node to the security module 980 of the same node when the routing module 970 deletes or removes a neighbor node entry from the neighbor node table.

In the foregoing specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense, and all such modifications are intended to be included within the scope of the present invention.

We claim:

1. A node configured to manage a security association with at least one particular neighbor node in a wireless network, the node comprising:
   a neighbor node table configured to store an entry for at least one neighbor node comprising attributes associated with the neighbor node, wherein the attributes comprise at least one of:
      Link Quality Measurements (LQMs) which account for the quality of a wireless link with the particular neighbor node;
      routing metrics which account for metrics along a route to the particular neighbor node;
      mobility domain information comprising a mobility domain value advertised by the particular neighbor node;
      mobility information about the particular neighbor node; and
      security association state information for the particular node;
   a security module configured to store security association information associated with each neighbor node, and
   a routing module communicatively coupled to the security module, wherein the routing module is configured to:
   determine, based on particular attributes associated with each neighbor node in the neighbor node table, at least one of the particular neighbor nodes from the neighbor node table that the node will attempt to establish a security association with;
   select at least one of the particular neighbor nodes the node will attempt to establish the security association with; and
   send a first message to the security module to trigger the security module to attempt to establish a particular security association with the particular neighbor node that is selected.

2. A node according to claim 1, wherein the security association information comprises: security association state information between a pair of nodes and key material.

3. A node according to claim 1, wherein the security module is further configured to:
   send a second message to attempt to establish the security association with the particular neighbor node, wherein the node and the particular neighbor node attempt establish the security association;
   determine whether the security association has been successfully established between the node and the selected neighbor node; and
   send a third message to the routing module when the node and the particular neighbor node establish the security association, wherein the third message comprises security association state information, wherein the security association state information comprises either an indication that the nodes have a security association or an indication that the nodes do not have a security association.

4. A node according to claim 3, wherein the routing module is further configured to:
   synchronize to the security association state information from the security module.

5. A node according to claim 4, wherein the routing module is further configured to synchronize to the security association state information from the security module by being configured to:
   update an entry in the neighbor node table for the particular neighbor node with the security association state information, and
   set a security association established flag in the entry in the neighbor node table for the particular neighbor node to indicate that the node and the particular neighbor node share the security association.

6. A node according to claim 4, wherein the routing module is configured to:
   establish a route between the node and the particular neighbor node after the security association is established.

7. A node according to claim 1, wherein the routing module is configured to:
   determine, based on particular attributes associated with each neighbor node in the neighbor node table, particular neighbor nodes from the neighbor node table that the node will attempt to establish the security association with;
   select the particular neighbor nodes which the node will attempt to establish the security association with; and send a first message to the security module to trigger establishment of security associations with the particular neighbor nodes that are selected.

8. A node according to claim 1, wherein the wireless network comprises a wireless mesh network, wherein the node comprises a first peer mesh node, and wherein the second node comprises a second peer mesh node.

9. A node according to claim 8, wherein the wireless mesh network comprises a wireless mesh ad hoc network.

10. A node according to claim 1, wherein the routing module is configured to:
 remove entries for stale neighbor nodes from the neighbor node table; and
 send an indication to the security module which indicates that the stale neighbor node entries have been removed from the neighbor node table.

11. A node according to claim 10, wherein the routing module is further configured to:
 detect the presence of neighbor nodes within communication range of the node based on messages received from the neighbor nodes, and modify the neighbor node table, using information received in the messages from the neighbor nodes, to include an entry for each neighbor node, wherein each entry comprises attributes associated with a particular neighbor node, wherein the attributes for each neighbor node comprise security association information which indicates whether the node has established a security association with the particular neighbor node; and
 determine which neighbor node entries are stale and to be removed from the neighbor node table; and
 notify the security module that: a security association corresponding to the particular neighbor node has been removed from the neighbor node table.

12. A node according to claim 11, wherein the routing module is configured to determine which neighbor node entries are stale and to be removed from the neighbor node table by being configured to:
 check the neighbor node table entry for each particular neighbor node to determine a number of missed messages from the particular neighbor node; and
 determine if the number of missed messages from the particular neighbor node exceeds a threshold.

13. A node according to claim 12, wherein the routing module is configured to:
 maintain a flag which indicates state of the security association for that particular neighbor node in the neighbor node table if the number of missed messages from the particular neighbor node is less than or equal the threshold.

14. A node according to claim 13, wherein the routing module is configured to remove entries for stale neighbor nodes from the neighbor node table by being configured to:
 designate the neighbor node table entry for each particular neighbor node as stale if the number of missed messages from the particular neighbor node exceeds the threshold, wherein the stale entries are removed from the neighbor node table; and
 remove entries for stale neighbor nodes from the neighbor table if the number of missed messages from the particular neighbor node is greater than the threshold number.

15. A node according to claim 14, wherein the routing module is further configured to:
 send a message to the security module indicating that the routing module has removed the particular neighbor node from the neighbor node list; and
 wherein the security module is further configured to mark a security association for the particular neighbor node as being eligible for removal.

16. A node according to claim 15, wherein the security module is configured to:
 remove stale security associations from the security module, wherein stale security associations are marked as removal eligible security associations.

17. A node according to claim 1, wherein the security module further comprises a security association table comprising a timer associated with each security association, and wherein the security module is configured to remove stale security associations from the security association table by being configured to:
 start a particular timer when a particular security association is established;
 determine if the particular timer has expired; and
 remove the particular security association associated with that particular timer from the security association table if the particular timer has expired.

18. A node according to claim 17, wherein the security module is configured to:
 send a remove message to the routing module indicating that the security association information for that particular neighbor node has been removed from the security module, and that the routing module should remove the particular security association state information.

19. A node according to claim 17, wherein the routing module is configured to:
 receive the remove message from the security module; and
 remove a security association flag for that particular neighbor node from the neighbor node table.

20. A method for managing a security association between a node and at least one particular neighbor node in a wireless network, wherein the node comprises: a neighbor node table configured to store an entry for at least one neighbor node comprising attributes associated with the neighbor node; a security module configured to store security association information associated with each neighbor node, and a routing module communicatively coupled to the security module, the method comprising:
 determining, at the routing module based on particular attributes associated with each neighbor node in the neighbor node table, at least one of the particular neighbor nodes from the neighbor node table that the node will attempt to establish a security association with, wherein the particular attributes comprise: Link Quality Measurements (LQMs) which account for the quality of a wireless link with the particular neighbor node, routing metrics which account for metrics along a route to the particular neighbor node, mobility domain information comprising a mobility domain value advertised by the particular neighbor node, mobility information about the particular neighbor node, and security association state information for the particular node;
 selecting, at the routing module, at least one of the particular neighbor nodes the node will attempt to establish the security association with; and
 sending a first message from the routing module to the security module to trigger the security module to attempt to establish a particular security association with the particular neighbor node that is selected.

21. A method according to claim 20, wherein the security association information comprises: security association state information between a pair of nodes and key material.

22. A method according to claim 20, further comprising:
 sending, from the security module, a second message to attempt to establish the security association with the particular neighbor node, wherein the node and the particular neighbor node attempt establish the security association;

determining, at the security module, whether the security association has been successfully established between the node and the selected neighbor node; and sending a third message from the security module to the routing module when the node and the particular neighbor node establish the security association, wherein the third message comprises security association state information, wherein the security association state information comprises either an indication that the nodes have a security association or an indication that the nodes do not have a security association.

23. A method according to claim 22, further comprising: synchronizing the routing module to the security association state information from the security module.

24. A method according to claim 23, wherein synchronizing the routing module to the security association state information from the security module, further comprises:

updating an entry in the neighbor node table for the particular neighbor node with the security association state information; and setting a security association established flag in the entry in the neighbor node table for the particular neighbor node to indicate that the node and the particular neighbor node share the security association.

25. A method according to claim 23, further comprising: establishing, at the routing module, a route between the node and the particular neighbor node after the security association is established.

26. A method according to claim 20, wherein the routing module is configured to:

determining, at the routing module based on particular attributes associated with each neighbor node in the neighbor node table, particular neighbor nodes from the neighbor node table that the node will attempt to establish the security association with;

selecting, at the routing module, the particular neighbor nodes which the node will attempt to establish the security association with; and sending a first message from the routing module to the security module to trigger establishment of security associations with the particular neighbor nodes that are selected.

27. A method according to claim 20, further comprising: removing entries for stale neighbor nodes from the neighbor node table; and sending an indication from the routing module to the security module which indicates that the stale neighbor node entries have been removed from the neighbor node table.

28. A method according to claim 27, wherein the routing module is further configured to:

detecting, at the routing module, the presence of neighbor nodes within communication range of the node based on messages received from the neighbor nodes, and modify the neighbor node table, using information received in the messages from the neighbor nodes, to include an entry for each neighbor node, wherein each entry comprises attributes associated with a particular neighbor node, wherein the attributes for each neighbor node comprise security association information which indicates whether the node has established a security association with the particular neighbor node; and determining, at the routing module, which neighbor node entries are stale and to be removed from the neighbor node table; and notifying, the security module that a security association corresponding to the particular neighbor node has been removed from the neighbor node table.

29. A method according to claim 28, wherein determining, at the routing module, which neighbor node entries are stale and to be removed from the neighbor node table, further comprises:

checking, at the routing module, the neighbor node table entry for each particular neighbor node to determine a number of missed messages from the particular neighbor node; and determining, at the routing module, if the number of missed messages from the particular neighbor node exceeds a threshold.

30. A method according to claim 29, further comprising: maintaining, at the routing module, a flag which indicates state of the security association for that particular neighbor node in the neighbor node table if the number of missed messages from the particular neighbor node is less than or equal the threshold.

31. A method according to claim 30, wherein removing entries for stale neighbor nodes from the neighbor node table, comprises:

designating, at the routing module, the neighbor node table entry for each particular neighbor node as stale if the number of missed messages from the particular neighbor node exceeds the threshold, wherein the stale entries are removed from the neighbor node table; and removing entries for stale neighbor nodes from the neighbor table if the number of missed messages from the particular neighbor node is greater than the threshold number.

32. A method according to claim 31, further comprising: sending a message from the routing module to the security module indicating that the routing module has removed the particular neighbor node from the neighbor node list; and marking, at the security module, a security association for the particular neighbor node as being eligible for removal.

33. A method according to claim 20, wherein the security module further comprises a security association table comprising a timer associated with each security association, and further comprising:

removing stale security associations from the security association table by:
    starting a particular timer when a particular security association is established;
    determining if the particular timer has expired; and
    removing the particular security association associated with that particular timer from the security association table if the particular timer has expired.

34. A system, comprising:
a particular neighbor node; and
a node configured to manage a security association with the particular neighbor node, wherein the node comprises:
a neighbor node table configured to store an entry for at least the particular neighbor node comprising attributes associated with the particular neighbor node, wherein the attributes comprise: Link Quality Measurements (LQMs) which account for the quality of a wireless link with the particular neighbor node, routing metrics which account for metrics along a route to the particular neighbor node, mobility domain information comprising a mobility domain value advertised by the particular neighbor node, mobility information about the particular neighbor node, and security association state information for the particular node;
a security module configured to store security association information associated with each neighbor node, and
a routing module communicatively coupled to the security module, wherein the routing module is configured to: determine, based on particular attributes associated with each neighbor node in a neighbor node table, at least one of the particular neighbor nodes from the neighbor node table that the node will attempt to establish a security association with; select at least one of the particular neighbor nodes the node will attempt to establish the security association with; and send a first message to the security module to trigger the security module to attempt to establish a particular security association with the particular neighbor node that is selected.

35. A system according to claim 34, wherein the routing module is configured to: remove entries for stale neighbor nodes from the neighbor node table; send an indication to the security module which indicates that the stale neighbor node entries have been removed from the neighbor node table; detect the presence of neighbor nodes within communication range of the node based on messages received from the neighbor nodes, and modify the neighbor node table, using information received in the messages from the neighbor nodes, to include an entry for each neighbor node, wherein each entry comprises attributes associated with a particular neighbor node, wherein the attributes for each neighbor node comprise security association information which indicates whether the node has established a security association with the particular neighbor node; and determine which neighbor node entries are stale and to be removed from the neighbor node table; and notify the security module that: a security association corresponding to the particular neighbor node has been removed from the neighbor node table.

36. A system according to claim 35, wherein the routing module is configured to: determine which neighbor node entries are stale and to be removed from the neighbor node table by being configured to: check the neighbor node table entry for each particular neighbor node to determine a number of missed messages from the particular neighbor node; and determine if the number of missed messages from the particular neighbor node exceeds a threshold, and wherein the routing module is configured to: maintain a flag which indicates state of the security association for that particular neighbor node in the neighbor node table if the number of missed messages from the particular neighbor node is less than or equal the threshold, and is configured to remove entries for stale neighbor nodes from the neighbor node table by being configured to: designate the neighbor node table entry for each particular neighbor node as stale if the number of missed messages from the particular neighbor node exceeds the threshold, wherein the stale entries are removed from the neighbor node table; and remove entries for stale neighbor nodes from the neighbor table if the number of missed messages from the particular neighbor node is greater than the threshold number.

37. A system according to claim 34, wherein the security module further comprises a security association table comprising a timer associated with each security association, and wherein the security module is configured to remove stale security associations from the security association table by being configured to: start a particular timer when a particular security association is established; determine if the particular timer has expired; and remove the particular security association associated with that particular timer from the security association table if the particular timer has expired.

38. A system according to claim 37, wherein the security module is configured to: send a remove message to the routing module indicating that the security association information for that particular neighbor node has been removed from the security module, and that the routing module should remove the particular security association state information.

\* \* \* \* \*